(12) United States Patent
Oetting (10) Patent No.: US 10,399,617 B2
(45) Date of Patent: Sep. 3, 2019

(54) TIRE CARRIER (71) Applicant: GM GLOBAL TECHNOLOGY OPERATIONS LLC, Detroit, MI (US)

(72) Inventor: Luciano L. Oetting, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 3 days.

(21) Appl. No.: 15/675,907

(22) Filed: Aug. 14, 2017

(65) Prior Publication Data
US 2019/0047642 A1    Feb. 14, 2019

(51) Int. Cl.
*B62D 43/04* (2006.01)
*B62D 43/00* (2006.01)

(52) U.S. Cl.
CPC ......... *B62D 43/045* (2013.01); *B62D 43/002* (2013.01); *B62D 43/007* (2013.01); *Y10S 414/13* (2013.01)

(58) Field of Classification Search
CPC ...... B60R 19/26; B62D 43/04; B62D 43/002; B62D 43/045; Y10S 414/13
See application file for complete search history.

(56) References Cited

U.S. PATENT DOCUMENTS

| | | | | |
|---|---|---|---|---|
| 1,623,377 A * | 4/1927 | Bacon | .................... | B62D 43/00 296/37.2 |
| 2,028,945 A * | 1/1936 | Morrison | ................ | B60R 19/26 224/490 |
| 3,187,914 A * | 6/1965 | Peras | ..................... | B62D 43/04 224/42.21 |
| 3,237,921 A * | 3/1966 | Jay | ......................... | B66F 7/0608 108/147 |
| 3,485,399 A * | 12/1969 | Hebnes | .................. | B62D 43/04 414/466 |
| 4,072,258 A * | 2/1978 | Cruson | ................ | B62D 43/002 224/42.21 |
| 4,573,855 A * | 3/1986 | Braswell | ................ | B62D 43/04 224/42.23 |
| 4,600,171 A * | 7/1986 | Kalisz | ...................... | B64D 1/04 244/137.1 |
| 4,673,328 A * | 6/1987 | Shiels | ..................... | B60P 1/025 254/10 R |
| 4,795,302 A * | 1/1989 | Dalton | .................. | B62D 43/04 224/42.23 |
| 5,092,542 A * | 3/1992 | Ellis | ......................... | B64D 1/06 244/137.4 |
| 5,308,158 A * | 5/1994 | Vogelgesang | .......... | A47B 77/10 211/170 |
| 5,456,564 A * | 10/1995 | Bianchini | ................. | B60P 3/07 224/508 |
| 5,924,325 A * | 7/1999 | Brucher | .................... | C21B 7/12 266/272 |

(Continued)

*Primary Examiner* — Gregory W Adams
(74) *Attorney, Agent, or Firm* — Cantor Colburn LLP (57) ABSTRACT

A tire carrier assembly is provided and includes a bracket, a tire carrier, a carrier support and a hoist. The carrier support is lockable and unlockable and is configured to support the tire carrier in a stowed position when locked and to swing the tire carrier toward a deployed position when unlocked. The hoist is coupled to the bracket and the carrier support and is configured to normally lock the carrier support and to be selectively actuatable to unlock the carrier support.

17 Claims, 4 Drawing Sheets (56) References Cited

U.S. PATENT DOCUMENTS

| | | | | |
|---|---|---|---|---|
| 5,975,830 | A | * | 11/1999 | Goodrich ............... B60P 1/02 |
| | | | | 414/541 |
| 5,993,133 | A | * | 11/1999 | Murray ............... B62D 43/045 |
| | | | | 224/42.12 |
| 6,053,690 | A | * | 4/2000 | Hanson ............... B62D 43/04 |
| | | | | 224/42.21 |
| 7,048,490 | B2 | * | 5/2006 | Henderson ............ B60R 9/042 |
| | | | | 224/310 |
| 8,690,033 | B2 | * | 4/2014 | Harriton ............... B62D 43/02 |
| | | | | 224/319 |

* cited by examiner

TIRE CARRIER

INTRODUCTION

The subject disclosure relates to a tire carrier. More particularly, the subject disclosure relates to a double articulated, under-vehicle, spare tire carrier.

Most vehicles today carry a spare tire in case one of the regular tires is damaged and becomes flat. This spare tire is normally secured within a trunk or another part of the vehicle where it would not be expected to interfere with vehicle performance or passenger comfort or safety. For example, many spare tires for automobiles are carried below a rear portion of the vehicle chassis underneath the trunk. In such cases, the spare tires are accessed by an operator of the vehicle through an actuation of a spare tire lowering assembly through a base of the trunk in order to lower the spare tire from the stowed position toward a deployed position and a subsequent removal of the spare tire by the operator from its support.

The process noted above can prove difficult for an operator where the spare tire is heavy and not easily removed from its support. Moreover, in certain current and future vehicles, regulations may be or have already been promulgated which stipulate that a fuel tank be installed in or around a location where spare tires are normally stowed and may require a redesign of the spare tire lowering assembly or the support. In particular, certain European standards for emissions require that a fuel tank, such as a diesel exhaust fluid (DEF) tank, be disposed in or around a spare tire location due to a lack of free space around other portions of the chassis and current hoist systems do not provide for usable volume inside the spare tire volume.

SUMMARY

In one exemplary embodiment, a tire carrier assembly is provided and includes a bracket, a tire carrier, a carrier support and a hoist. The carrier support is lockable and unlockable and is configured to support the tire carrier in a stowed position when locked and to swing the tire carrier toward a deployed position when unlocked. The hoist is coupled to the bracket and the carrier support and is configured to normally lock the carrier support and to be selectively actuatable to unlock the carrier support.

In addition to one or more of the features described herein, the bracket is attachable to a vehicle chassis.

In addition to one or more of the features described herein, the tire carrier includes a tire-shaped webbing.

In addition to one or more of the features described herein, the tire carrier includes a first tire carrier end including a tire constraint feature and a second tire carrier end defining a tire-sized aperture.

In addition to one or more of the features described herein, the stowed position is proximate to an underside of the bracket and the deployed position is distant from the underside of the bracket.

In addition to one or more of the features described herein, the carrier support maintains an orientation of the tire carrier relative to the bracket during the swing of the tire carrier toward the deployed position.

In addition to one or more of the features described herein, the carrier support includes swing members attachable to the bracket and the tire carrier.

In addition to one or more of the features described herein, the swing members include respective pairs of swing members at opposite bracket and tire carrier sides.

In addition to one or more of the features described herein, the hoist includes a hook anchored on the bracket and configured to hook onto the carrier support and is selectively actuatable to either release from the bracket or to unhook from the carrier support and to thereby unlock the carrier support.

In another exemplary embodiment, a tire carrier assembly is provided for a vehicle chassis. The tire carrier assembly includes a bracket attachable to the vehicle chassis, a tire carrier configured to support a tire, a carrier support and a hoist. The carrier support is lockable and unlockable and is configured to support the tire carrier in a stowed position with the tire proximate to the vehicle chassis when locked and to swing the tire carrier toward a deployed position with the tire distant from the vehicle chassis when unlocked. The hoist is coupled to at least one of the bracket and the vehicle chassis and to the carrier support and is configured to normally lock the carrier support and to be selectively actuatable to unlock the carrier support.

In addition to one or more of the features described herein, the tire carrier includes webbing shaped to accommodate the tire.

In addition to one or more of the features described herein, the tire carrier includes a first tire carrier end including a tire constraint feature and a second tire carrier end defining a tire-sized aperture.

In addition to one or more of the features described herein, the carrier support maintains an orientation of the tire carrier relative to the vehicle chassis during the swing of the tire carrier toward the deployed position.

In addition to one or more of the features described herein, the carrier support includes swing members attachable to the bracket and the tire carrier.

In addition to one or more of the features described herein, a tank is securely disposable within a volume of the tire when the tire carrier is in the stowed position with the tire proximate to the chassis.

In addition to one or more of the features described herein, the hoist includes a hook anchored on the at least one of the bracket and the vehicle chassis and configured to hook onto the carrier support and is selectively actuatable to either release from the at least one of the bracket and the vehicle chassis or to unhook from the carrier support and to thereby unlock the carrier support.

In yet another exemplary embodiment, a vehicle is provided and includes a chassis, a bracket attachable to the chassis, a tire carrier configured to support a tire, a carrier support and a hoist assembly. The carrier support is lockable to and unlockable from at least one of the chassis and the bracket and is configured to support the tire carrier in a stowed position with the tire proximate to the chassis and the bracket when locked and to swing the tire carrier toward a deployed position with the tire distant from the chassis and the bracket when unlocked. The hoist assembly is coupled to the at least one of the chassis and the bracket and to the carrier support and is configured to normally lock the carrier support to and to be selectively actuatable to unlock the carrier support from the at least one of the chassis and the bracket.

In addition to one or more of the features described herein, the tire carrier includes a first tire carrier end including a tire constraint feature and a second tire carrier end defining a tire-sized aperture and the carrier support substantially maintains an orientation of the tire carrier relative to the chassis during the swing toward the deployed position.

In addition to one or more of the features described herein, a tank is securely disposable within a volume of the tire when the tire carrier is in the stowed position with the tire proximate to the chassis.

In addition to one or more of the features described herein, the carrier support includes respective pairs of swing members attachable to the bracket and the tire carrier at opposite bracket and tire carrier sides, respectively, the hoist includes a hook anchored on the at least one of the chassis and the bracket and configured to hook onto the carrier support and the hoist is selectively actuatable to either release from the at least one of the chassis and the bracket or to unhook from the carrier support and to thereby unlock the carrier support.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figures 1, 2:
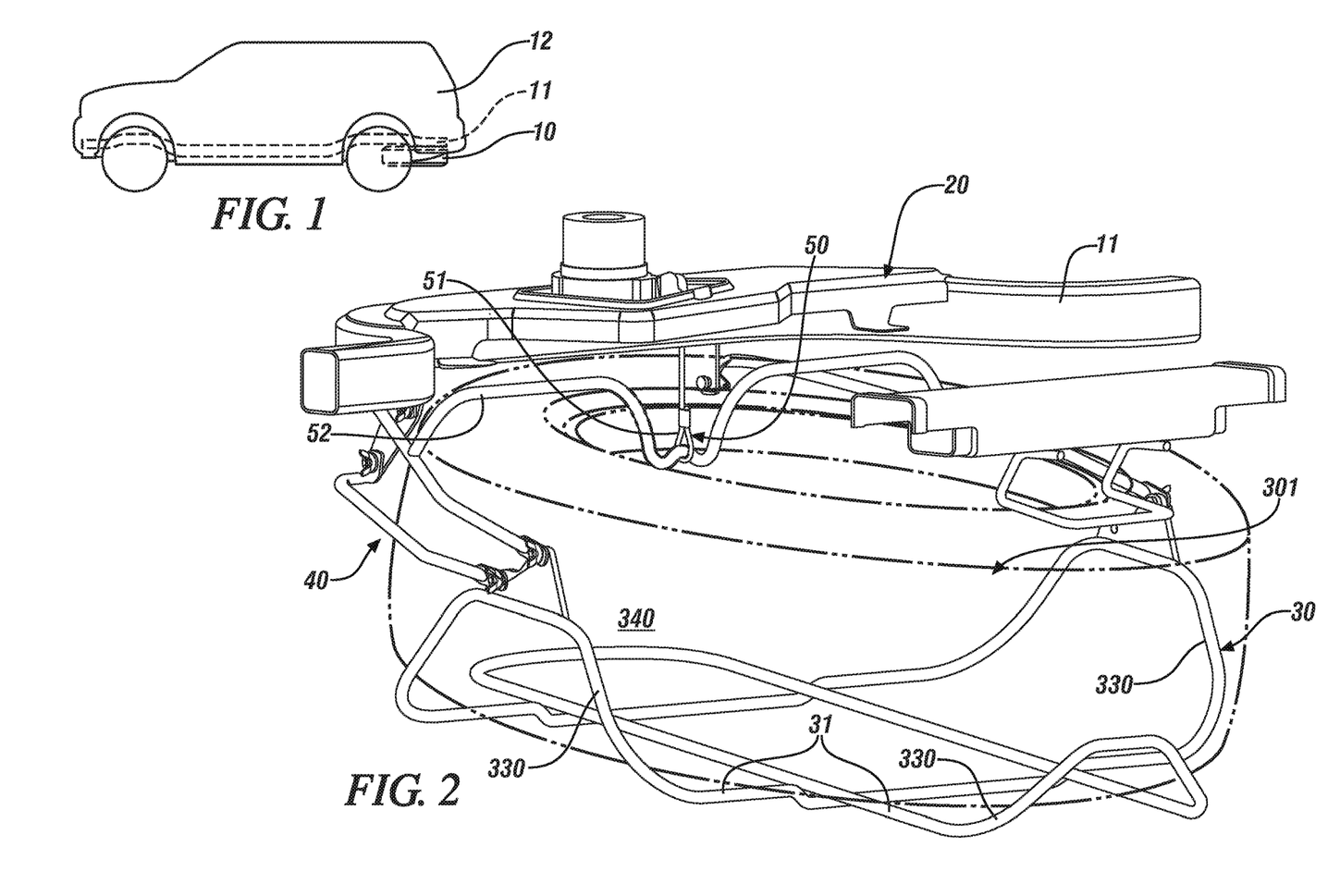
FIG. 1 is a side schematic view of a vehicle in accordance with embodiments.
FIG. 2 is a perspective view of a tire carrier assembly of a vehicle in accordance with embodiments.

With reference to FIGS. 1 and 2, in accordance with exemplary embodiments, a tire carrier assembly 10 is provided for use with a chassis 11 of a vehicle 12. The vehicle 12 may be any vehicle that moves along the ground on tires and thus needs to have at least one or more spare tire at any given time in case of an accident or damage to one of the regular tires. In an exemplary case, the vehicle 12 may be a passenger car or a truck but it is to be understood that the following description is not limited to any one particular arrangement or vehicle type. In any case, the tire carrier assembly 10 provides for an under-vehicle, spare tire carrier that allows for the usage of a volume of space within the spare tire, keeps the spare tire always parallel or substantially parallel to the ground, requires a relatively small removal space and improves ergonomics for an operator of the vehicle 12 by moving the spare tire closer to the operator during a removal operation.

Figure 3:
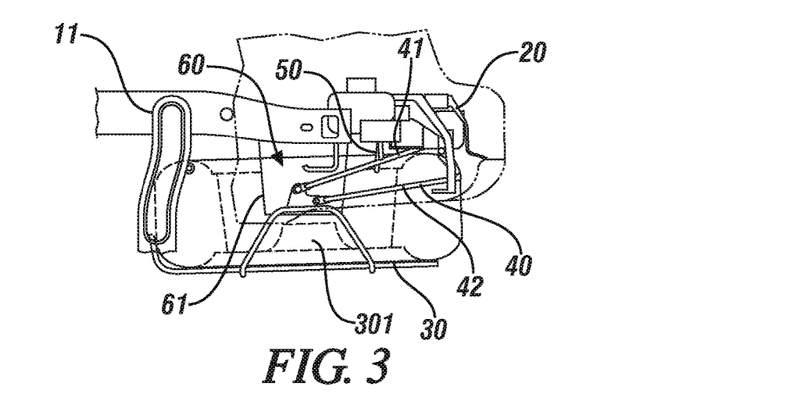
FIG. 3 is a side view illustrating an initial stage of an operation of the tire carrier assembly of FIG. 2.
Figure 4:
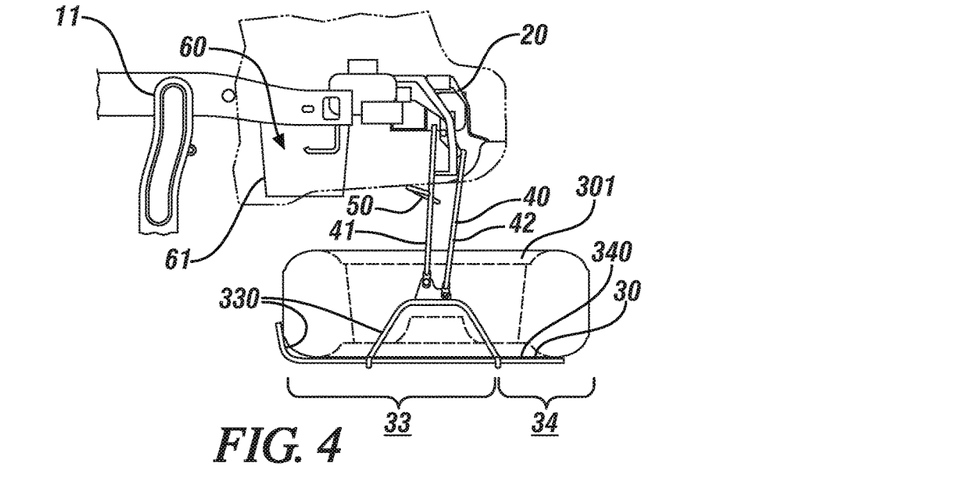
FIG. 4 is a side view illustrating an intermediate stage of an operation of the tire carrier assembly of FIG. 2.
Figure 5:
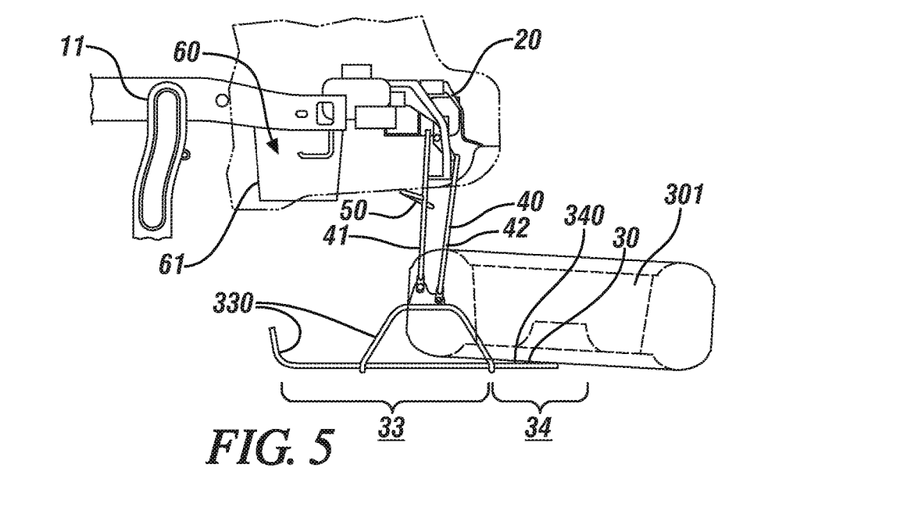
FIG. 5 is a side view illustrating an end stage of an operation of the tire carrier assembly of FIG. 2.

As shown in FIG. 2 and with additional reference to FIGS. 3-5, the tire carrier assembly 10 includes an assembly bracket 20 that is attachable to the chassis 11 by any suitable attachment or fastening feature, a tire carrier 30 that is configured to support or contain therein a tire 301, such as a spare tire for the vehicle 12 of FIG. 1, a tire carrier support assembly 40 and a hoist system 50. The tire carrier support assembly 40 is lockable to and unlockable from at least one of the chassis 11 and the assembly bracket 20 by the hoist system 50 as will be described herein.

The tire carrier support assembly 40 is configured to support the tire carrier 30 in a stowed position when the tire carrier support assembly 40 is locked to the at least one of the chassis 11 and the assembly bracket 20. The stowed position is characterized in that the tire carrier 30 and the tire 301 that is supported or contained therein is/are disposed proximate to respective undersides of the chassis 11 and the assembly bracket 20 (see FIG. 3). The tire carrier support assembly 40 is also configured to swing the tire carrier 30 toward a deployed position when the tire carrier support assembly 40 is unlocked from the at least one of the chassis 11 and the assembly bracket 20. The deployed position is characterized in that the tire carrier 30 and the tire 301 supported or contained therein is/are disposed at a distance from the respective undersides of the chassis 11 and the assembly bracket 20 (see FIGS. 4 and 5).

The hoist system 50 is coupled to the at least one of the chassis 11 and the assembly bracket 20 and to the tire carrier support assembly 40. As such, the hoist system 50 is configured to normally lock the tire carrier support assembly 40 to the at least one of the chassis 11 and the assembly bracket 20. The hoist system 50 is also configured to be selectively actuatable by, for example an operator of the vehicle 12 to unlock the tire carrier support assembly 40 from the at least one of the chassis 11 and the assembly bracket 20.

Figure 6:
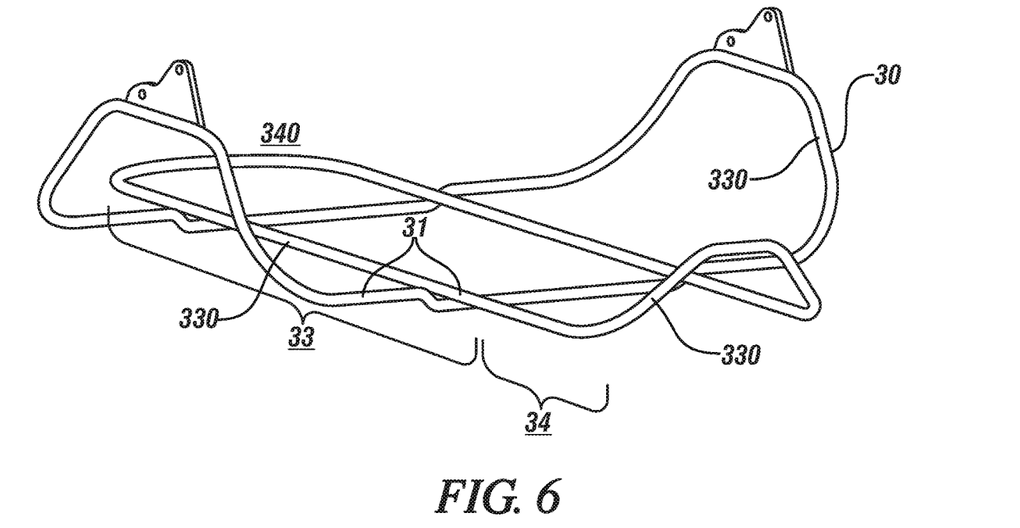
FIG. 6 is a perspective view of a tire carrier of the tire carrier assembly of FIG. 2 in accordance with embodiments.
Figure 7:
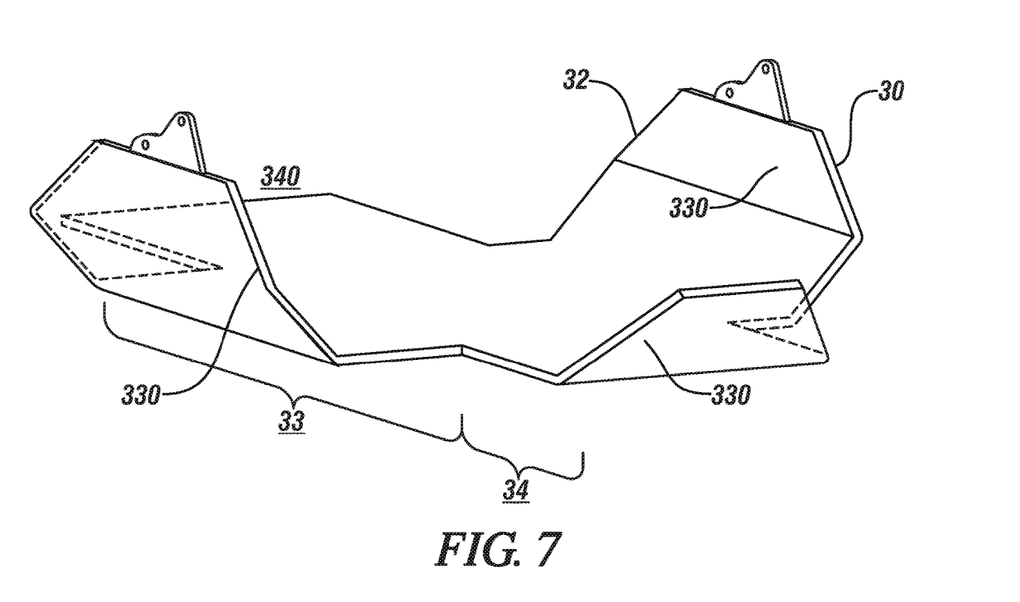
FIG. 7 is a perspective view of a tire carrier of the tire carrier assembly of FIG. 2 in accordance with alternative embodiments.

With reference to FIGS. 6 and 7, the tire carrier 30 may be provided with multiple configurations and structures. For example, as shown in FIG. 6, the tire carrier 30 may include webbing 31 that is shaped to accommodate the tire. Such webbing 31 may include one or more sets of cross-bars that crisscross with one another to form a bucket-type support for the tire. As another example, as shown in FIG. 7, the tire carrier 30 may include a plate element 32 that is shaped to accommodate the tire.

With continued reference to FIGS. 6 and 7 and with reference back to FIGS. 4 and 5, the tire carrier 30 may have a first tire carrier end 33 and a second tire carrier end 34. Where the tire carrier support assembly 10 is provided at or proximate to a rear of the vehicle 12, the first tire carrier end 33 faces toward a front of the vehicle 12 and the second tire carrier end 34 faces toward a rear of the vehicle 12. Thus, as the tire carrier 30 is swung toward the deployed position as shown in FIGS. 4 and 5, the second tire carrier end 34 approaches an operator standing behind the vehicle 12. With this frame of reference, at least the first tire carrier end 33 of the tire carrier 30 includes tire constraint features 330 and the second tire carrier end 34 is formed to define a tire-sized aperture 340. As shown in FIGS. 6 and 7, the tire constraint features 330 may be formed as upward turned wings of the webbing 31 or the plate 32 such that the tire can be secured in place whereas the tire-sized aperture 340 may be provided as an absence of such features such that, when the tire carrier 30 is swung toward the deployed position, the tire can be ejected from the tire carrier 30 through the tire-sized aperture 340 or at least be relatively easily withdrawn.

Figure 8:
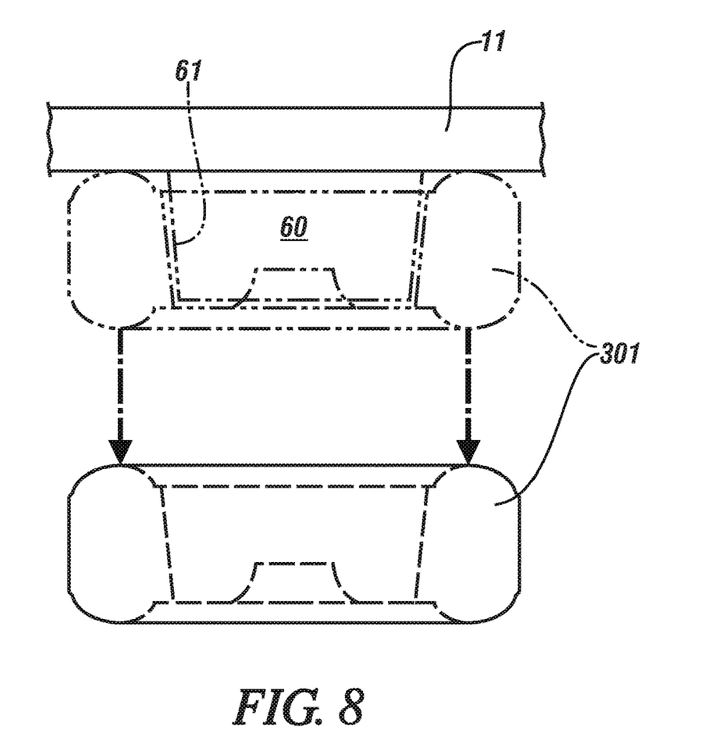
FIG. 8 is an enlarged side view of a movement of a tire about a tank in accordance with embodiments.

With reference to FIG. 8 and with reference back to FIGS. 3-5, the tire carrier support assembly 40 is configured to maintain or at least substantially maintain an orientation of the tire carrier 30 relative to the chassis 11 during the swing of the tire carrier 30 toward the deployed position (see FIGS. 3-5). That is, where the vehicle 12 is disposed on level ground, the tire carrier support assembly 40 will maintain or substantially maintain the tire carrier 30 in a substantially horizontal orientation during the swing of the tire carrier 30 from the stowed position to the deployed position. As a result, as shown in FIG. 8, since the tire carrier 30 does not tilt to one side or another at any point during the swing, a volume of space 60 that is defined within the central portion of the tire when the tire carrier 30 is in the stowed position and supports or contains the tire therein, is not entered into by interior sidewalls of the tire during any portion of the swing.

As shown in FIGS. 3-5 and FIG. 8, since the tire carrier 30 does not tilt substantially to one side or another at any point during the swing and since the volume of space 60 is thus not invaded by interior sidewalls of the tire during any portion of the swing, the tire carrier assembly 10 or the vehicle 12 may include a tank 61 that is securely disposable within the volume of the space 60. The tank 61 may be provided, for example, as a diesel exhaust fluid (DEF) tank for purposes of meeting with or complying with local emissions regulations. In accordance with further embodiments, a jack and tools for changing tires may be provided in the space 60 in addition to or as an alternative to the tank 61.

Figure 9:
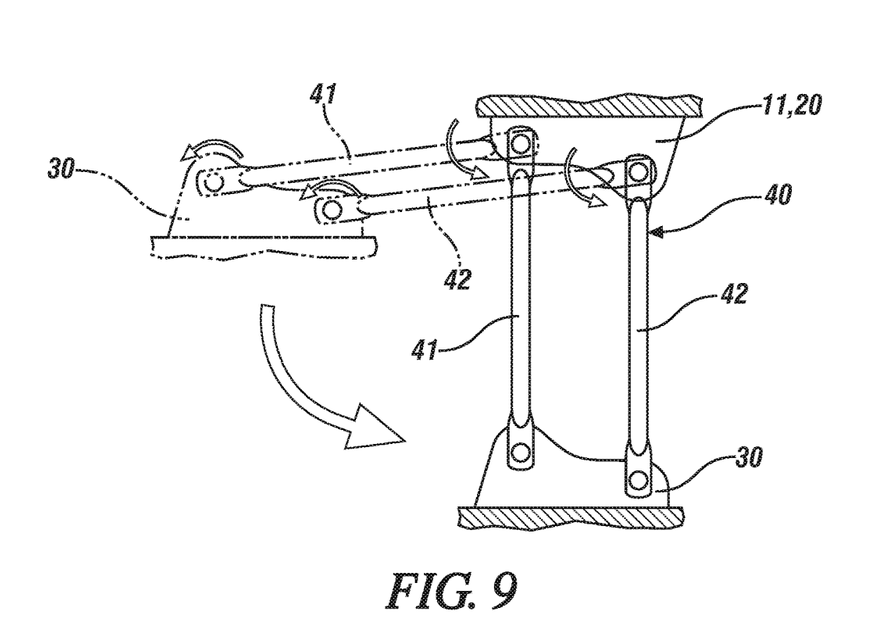
FIG. 9 is a side schematic view illustrating an operation of a tire carrier support assembly in accordance with embodiments.

With reference back to FIGS. 2-5 and with additional reference to FIG. 9, the tire carrier support assembly 40 achieves the orientation maintenance by way of a structure thereof. This structure includes respective pairs of primary and secondary swing members 41 and 42.

The primary swing members 41 each have first ends and second ends opposite the first ends. The secondary swing members 42 each have first ends and second ends opposite the first ends. The primary swing members 41 are each rotatably attachable at the first ends thereof to opposite lateral sides of the chassis 11 or the assembly bracket 20 by way of hinges, pin connections or other suitable mechanisms and at the second ends thereof to opposite lateral sides of the tire carrier 30 by way of hinges, pin connections or other suitable mechanisms. Similarly, the secondary swing members 42 are each rotatably attachable at the first ends thereof to the opposite lateral sides of the chassis 11 or the assembly bracket 20 by way of hinges, pin connections or other suitable mechanisms and at the second ends thereof to opposite lateral sides of the tire carrier 30 by way of hinges, pin connections or other suitable mechanisms. Thus, one of the primary swing members 41 and a corresponding one of the secondary swing members 42 are paired at a first lateral side of the chassis 11 or the assembly bracket 20 and the tire carrier 30 whereas a second one of the primary swing members 41 and a corresponding second ones of the secondary swing members 42 are paired at a second lateral side of the chassis 11 or the assembly bracket 20 and the tire carrier 30.

During the swing of the tire carrier 30 toward the deployed position, the primary swing members 41 each rotate about their respective rotatable attachments to the opposite lateral sides of the chassis 11 or the assembly bracket 20 in a first direction (i.e., counter-clockwise in FIGS. 3-5 and FIG. 9) while the secondary swing members 42 rotate about their respective attachments to the opposite lateral sides of the tire carrier 30 in a second direction (i.e., clockwise in FIGS. 3-5 and FIG. 9). The primary and secondary swing members 41 and 42 may be similar or different in length, substantially parallel or angled with respect to one another and attached at similar or different heights. The primary and secondary swing members 41 and 42 may be substantially straight or curved.

As shown in FIG. 2, the hoist system 50 may include a hook 51 which has a first end and a second end opposite the first end. The hook 51 may be anchored at the first end thereof on the chassis 11 or the assembly bracket 20 and may be configured to hook at the second end thereof onto a cross beam 52 of the tire carrier support assembly 40 which extends between the primary swing members 41 or the secondary swing members 42. The hook 51 of the hoist system 50 may be further configured to normally maintain the tire carrier support assembly 40 in the locked condition with the hoist system 50 as a whole being selectively actuatable to cause the hook 51 to either release from the chassis 11 or the assembly bracket 20 or to unhook from the cross beam 52 of the tire carrier support assembly 40 and in either case to thereby unlock the tire carrier support assembly 40. Selective actuation of the hoist system 50 may be performed by an operator of the vehicle 12 through any one of various operations.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A tire carrier assembly, comprising:
a bracket;
a tire carrier;
a carrier support which is lockable and unlockable and configured to support the tire carrier in a stowed position when locked and to swing the tire carrier toward a deployed position when unlocked; and
a hoist coupled to the bracket and the carrier support such that the hoist is configured to normally lock the carrier support to the bracket whereby the tire carrier is supported in the stowed position,
the hoist comprising a hook anchored on the bracket and configured to hook onto the carrier support and being selectively actuatable to either release from the bracket or to unhook from the carrier support to thereby unlock the carrier support from the bracket such that the carrier support is released from the bracket and swings the tire carrier toward the deployed position.

2. The tire carrier assembly according to claim 1, wherein the bracket is attachable to a vehicle chassis.

3. The tire carrier assembly according to claim 1, wherein the tire carrier comprises a tire-shaped webbing.

4. The tire carrier assembly according to claim 1, wherein the tire carrier comprises a first tire carrier end comprising a tire constraint feature and a second tire carrier end defining a tire-sized aperture.

5. The tire carrier assembly according to claim 1, wherein the stowed position is proximate to an underside of the bracket and the deployed position is distant from the underside of the bracket.

6. The tire carrier assembly according to claim 1, wherein the carrier support substantially maintains an orientation of the tire carrier relative to the bracket during the swing of the tire carrier toward the deployed position.

7. The tire carrier assembly according to claim 1, wherein the carrier support comprises swing members attachable to the bracket and the tire carrier.

8. A tire carrier assembly, comprising:
a bracket;
a tire carrier;
a carrier support comprising swing members attachable to the bracket and the tire carrier, the carrier support being lockable and unlockable and configured to support the tire carrier in a stowed position when locked and to swing the tire carrier toward a deployed position when unlocked; and
a hoist coupled to the bracket and the carrier support such that the hoist is configured to normally lock the carrier support to the bracket whereby the tire carrier is supported in the stowed position,
the hoist being selectively actuatable to unlock the carrier support from the bracket such that the carrier support is released from the bracket and swings the tire carrier toward the deployed position, and
wherein:
the swing members comprise respective pairs of swing members at opposite bracket and tire carrier sides, and
the swing members of each respective pair of swing members taper toward one another with decreasing distance toward the tire carrier.

9. A tire carrier assembly for a vehicle chassis and comprising:
a bracket attachable to the vehicle chassis;
a tire carrier configured to support a tire;
a carrier support which is lockable and unlockable and configured to support the tire carrier in a stowed position with the tire proximate to the vehicle chassis when locked and to swing the tire carrier toward a deployed position with the tire distant from the vehicle chassis when unlocked; and
a hoist coupled to at least one of the bracket and the vehicle chassis and to the carrier support such that the hoist is configured to normally lock the carrier support to the at least one of the bracket and the vehicle chassis whereby the tire carrier is supported in the stowed position,
the hoist comprising a hook anchored on the at least one of the bracket and the vehicle chassis and configured to hook onto the carrier support and being selectively actuatable to either release from the at least one of the bracket and the vehicle chassis or to unhook from the carrier support and to thereby unlock the carrier support to thereby unlock the carrier support from the at least one of the bracket and the vehicle chassis such that the carrier support is released from the at least one of the bracket and the vehicle chassis and swings the tire carrier toward the deployed position.

10. The tire carrier assembly according to claim 9, wherein the tire carrier comprises webbing shaped to accommodate the tire.

11. The tire carrier assembly according to claim 9, wherein the tire carrier comprises a first tire carrier end comprising a tire constraint feature and a second tire carrier end defining a tire-sized aperture.

12. The tire carrier assembly according to claim 9, wherein the carrier support substantially maintains an orientation of the tire carrier relative to the vehicle chassis during the swing of the tire carrier toward the deployed position.

13. The tire carrier assembly according to claim 9, further comprising a tank securely disposable within a volume of the tire when the tire carrier is in the stowed position with the tire proximate to the chassis.

14. A tire carrier assembly for a vehicle chassis and comprising:
a bracket attachable to the vehicle chassis;
a tire carrier configured to support a tire;
a carrier support which is lockable and unlockable and configured to support the tire carrier in a stowed position with the tire proximate to the vehicle chassis when locked and to swing the tire carrier toward a deployed position with the tire distant from the vehicle chassis when unlocked; and
a hoist coupled to at least one of the bracket and the vehicle chassis and to the carrier support such that the hoist is configured to normally lock the carrier support to the at least one of the bracket and the vehicle chassis whereby the tire carrier is supported in the stowed position,
the hoist being selectively actuatable to unlock the carrier support to thereby unlock the carrier support from the at least one of the bracket and the vehicle chassis such that the carrier support is released from the at least one of the bracket and the vehicle chassis and swings the tire carrier toward the deployed position, and
wherein:
the carrier support comprises respective pairs of swing members attachable to respective opposite sides of the bracket and the tire carrier, and
the swing members of each respective pair of swing members taper toward one another with decreasing distance toward the tire carrier.

15. A vehicle, comprising:
a chassis;
a bracket attachable to the chassis;
a tire carrier configured to support a tire;
a carrier support which is lockable to and unlockable from at least one of the chassis and the bracket and configured to support the tire carrier in a stowed position with the tire proximate to the chassis and the bracket when locked and to swing the tire carrier toward a deployed position with the tire distant from the chassis and the bracket when unlocked; and
a hoist assembly coupled to the at least one of the chassis and the bracket and to the carrier support such that the hoist is configured to normally lock the carrier support to the at least one of the chassis and the bracket whereby the tire carrier is supported in the stowed position,
the hoist being selectively actuatable to unlock the carrier support from the at least one of the chassis and the bracket such that the carrier support is released from the at least one of the chassis and the bracket and swings the tire carrier toward the deployed position
wherein:
the carrier support comprises respective pairs of swing members attachable to the bracket and the tire carrier at opposite bracket and tire carrier sides, respectively, the swing members of each respective pair of swing members taper toward one another with decreasing distance toward the tire carrier, the hoist comprises a hook anchored on the at least one of the chassis and the bracket and configured to hook onto the carrier support, and the hoist is selectively actuatable to either release from the at least one of the chassis and the bracket or to unhook from the carrier support and to thereby unlock the carrier support.

16. The vehicle according to claim 15, wherein:

the tire carrier comprises a first tire carrier end comprising a tire constraint feature and a second tire carrier end defining a tire-sized aperture, and the carrier support substantially maintains an orientation of the tire carrier relative to the chassis during the swing toward the deployed position.

17. The vehicle according to claim 15, further comprising a tank securely disposable within a volume of the tire when the tire carrier is in the stowed position with the tire proximate to the chassis.

\* \* \* \* \*